Figure 1:
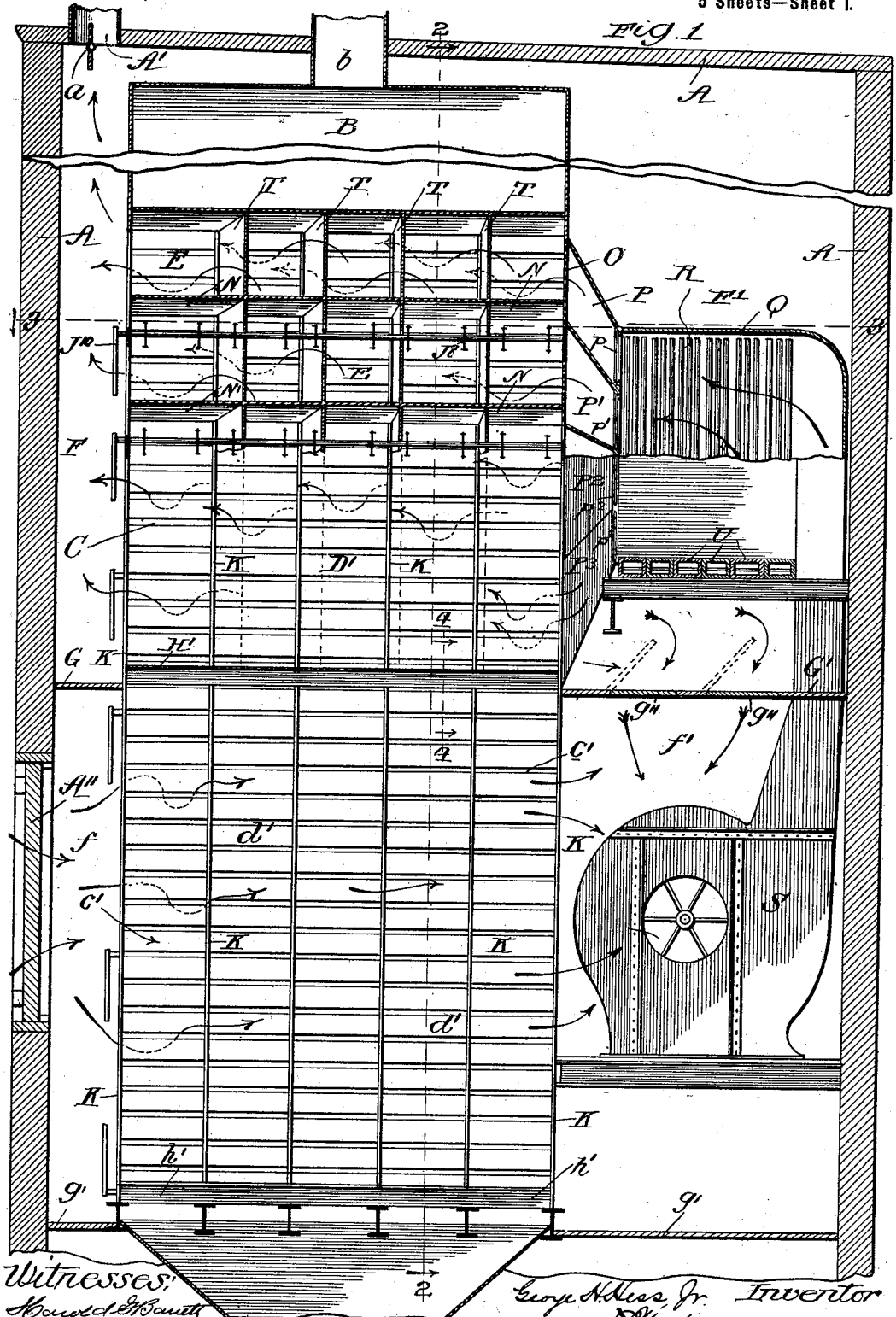

No. 707,323. Patented Aug. 19, 1902.
G. H. HESS, Jr.
APPARATUS FOR DRYING, COOLING, OR OTHERWISE TREATING GRAIN, &c.
(Application filed Jan. 24, 1901.)
(No Model.) 5 Sheets—Sheet 1.

No. 707,323. Patented Aug. 19, 1902.
G. H. HESS, Jr.
APPARATUS FOR DRYING, COOLING, OR OTHERWISE TREATING GRAIN, &c.
(Application filed Jan. 24, 1901.)
(No Model.) 5 Sheets—Sheet 2.

Witnesses:
Harold S. ...
Bertha E. Sims.

Inventor:
George H. Hess, Jr.
By R. H. Hopkins, Atty.

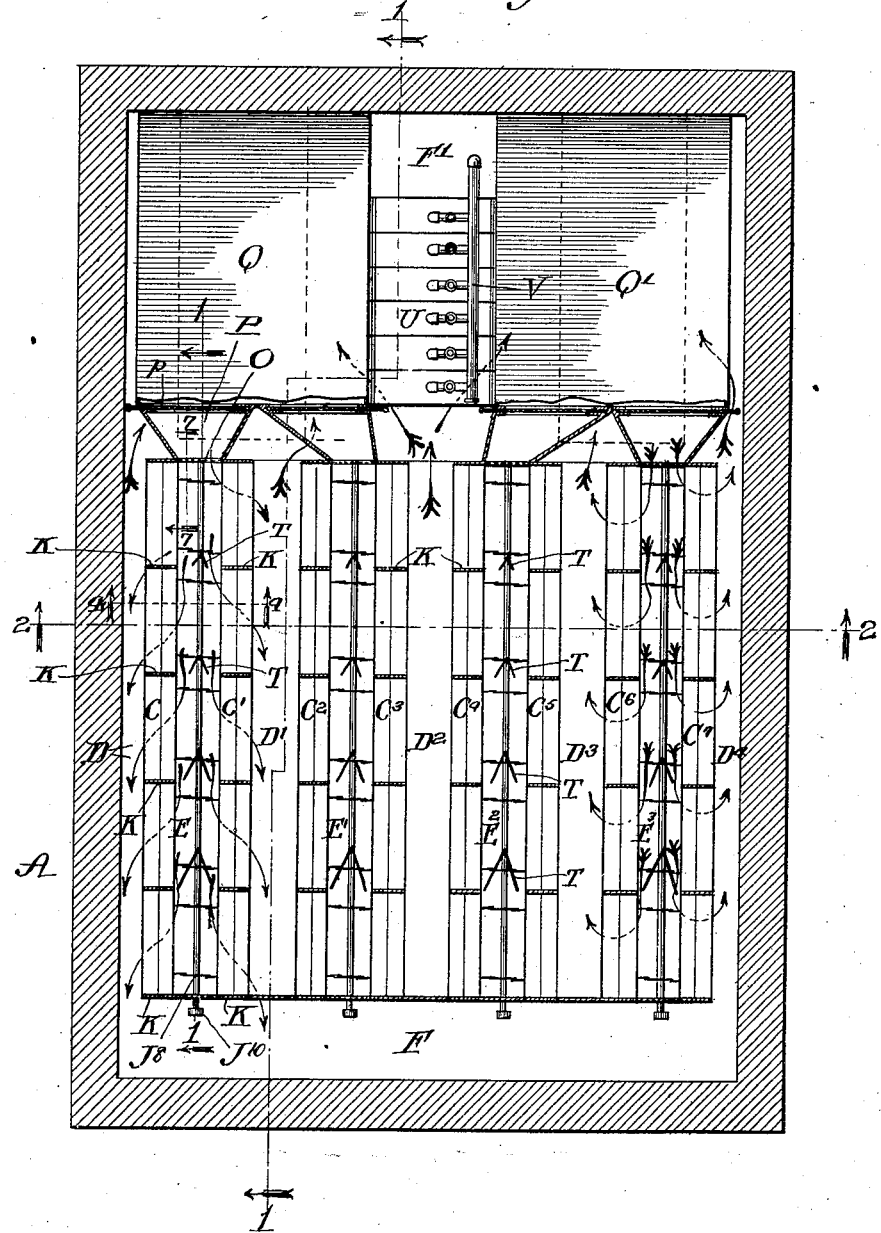

No. 707,323. Patented Aug. 19, 1902.
G. H. HESS, Jr.
APPARATUS FOR DRYING, COOLING, OR OTHERWISE TREATING GRAIN, &c.
(Application filed Jan. 24, 1901.)
(No Model.) 5 Sheets—Sheet 4.
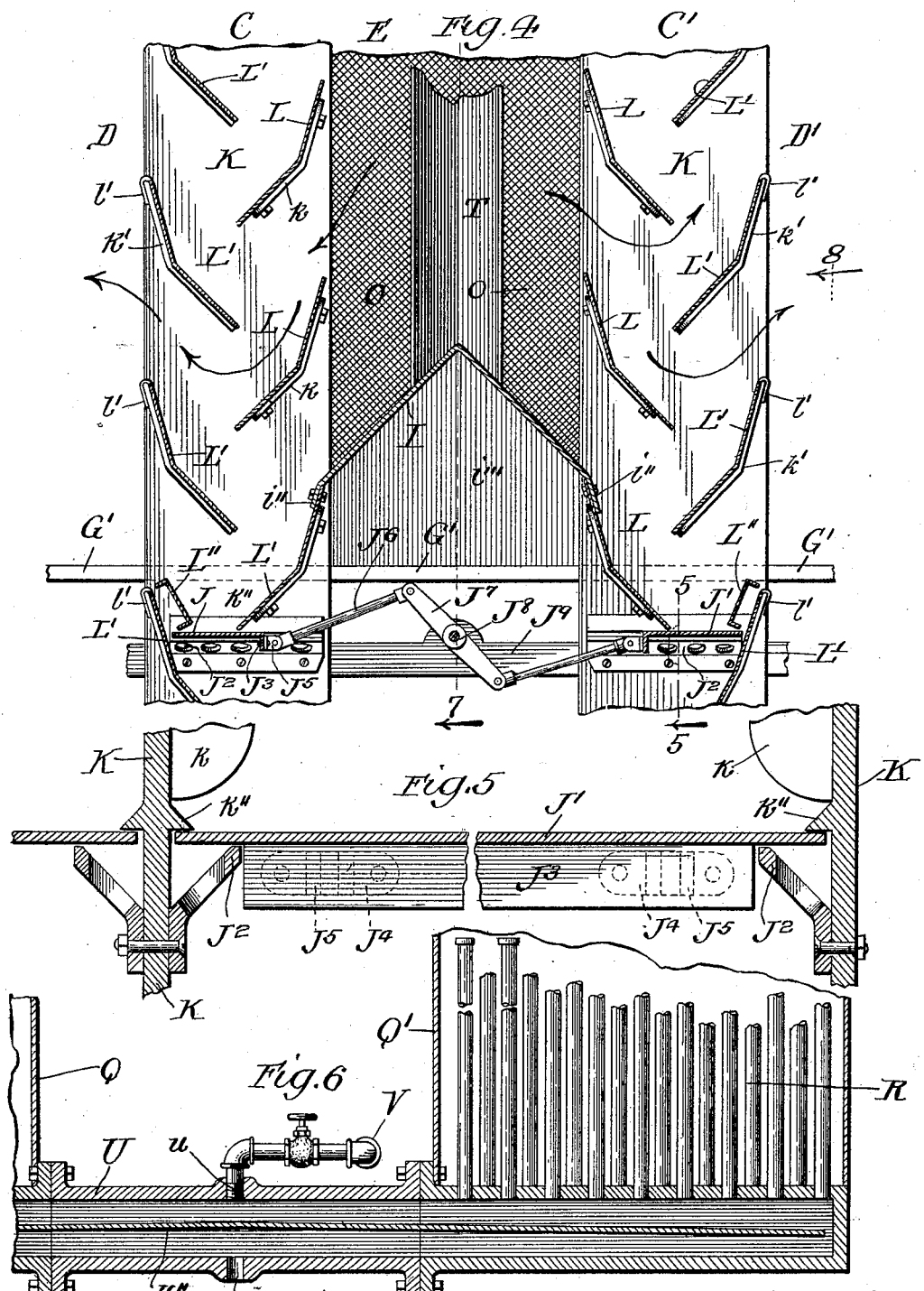

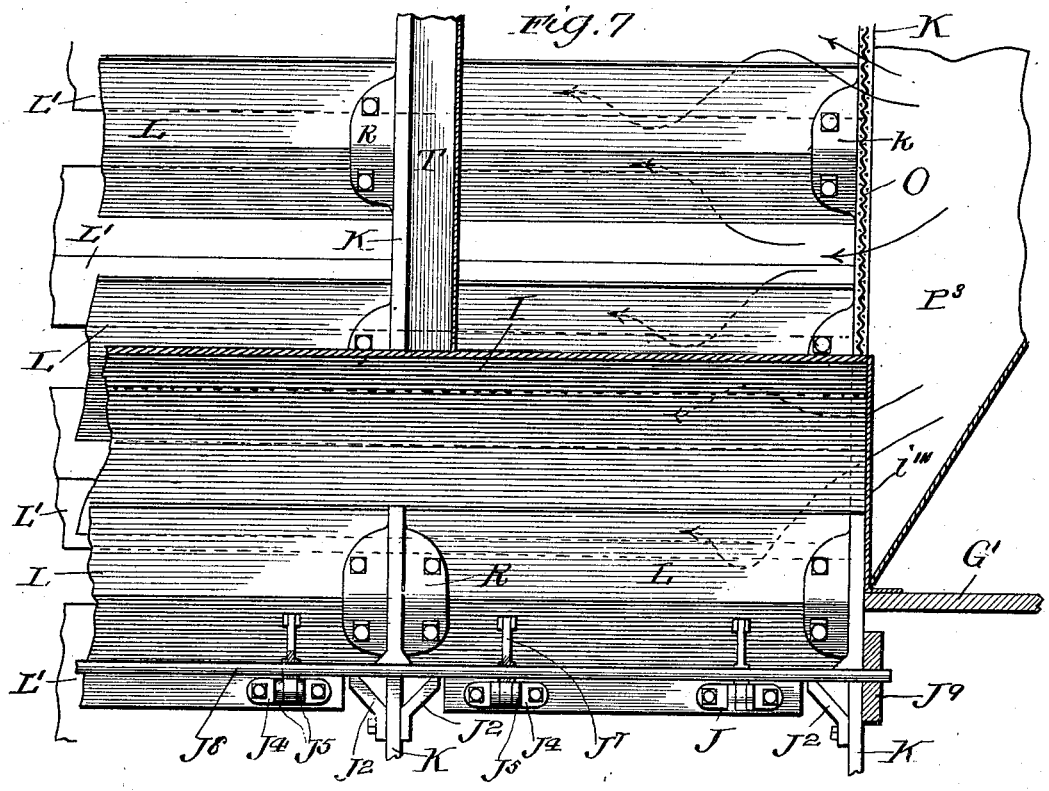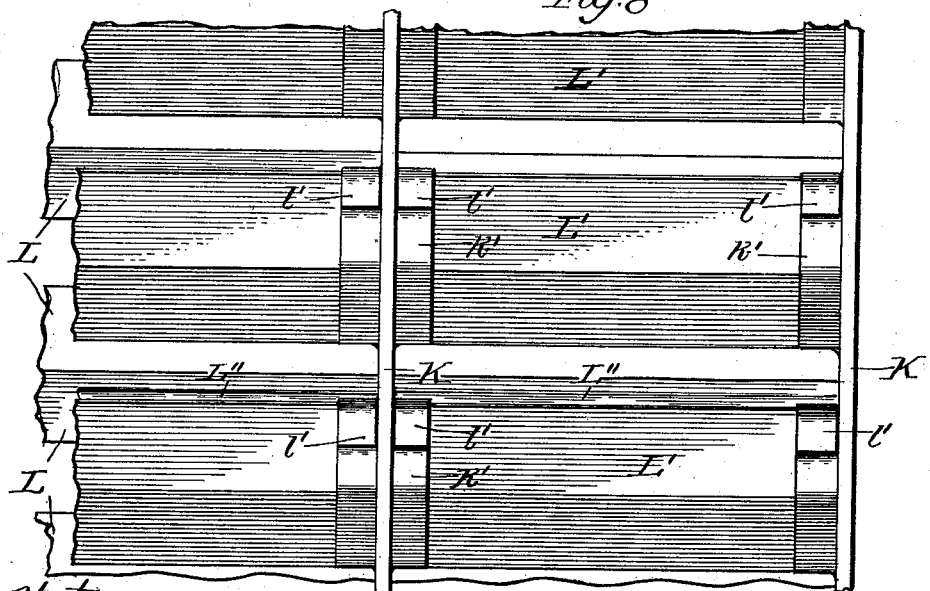

UNITED STATES PATENT OFFICE.

GEORGE H. HESS, JR., OF CHICAGO, ILLINOIS.

APPARATUS FOR DRYING, COOLING, OR OTHERWISE TREATING GRAIN, &c.

SPECIFICATION forming part of Letters Patent No. 707,323, dated August 19, 1902.

Application filed January 24, 1901. Serial No. 44,508. (No model.)

*To all whom it may concern:*

Be it known that I, GEORGE H. HESS, Jr., a citizen of the United States, residing at Chicago, in the county of Cook and State of Illinois, have invented certain new and useful Improvements in Apparatus for Drying, Cooling, or otherwise Treating Grain and other Substances, of which the following is a specification.

The present invention relates to an apparatus by which grain and other substances may be dried, cooled, heated without being dried, or otherwise treated by passing air or an aeriform fluid through it. The drying within the scope of the use of an apparatus embodying the invention may be accomplished by causing atmospheric air to pass through the grain, or it may be accomplished by causing heated air to pass through the grain, and in this latter event it is desirable to cool the grain after it is dried. This cooling may be accomplished by causing atmospheric air to pass through the dried and heated grain, whereby it absorbs the heat therefrom, after which it it heated and passed through another body of grain for the purpose of heating it. It is sometimes desirable to heat the grain without drying it, and within the scope of the use of an apparatus embodying the invention this may be accomplished by repeatedly passing the same body of air through the grain and through a heating apparatus alternately. In addition to these uses of the apparatus it may be used for otherwise treating grain or other substances by causing an aeriform fluid to pass through it.

Some features of the invention relate to apparatuses generally for treating grain in one or more of the ways above suggested, while others relate particularly to that class of apparatuses which have a number of upright (preferably vertical) racks in which the grain is contained while being treated, the racks being provided in their opposite sides with openings, so that air may pass through them from side to side, an example of such an apparatus being shown in United States Letters Patent No. 618,508, which were granted to me January 31, 1899. An apparatus of this type has a plurality of upright grain-racks arranged in one or more pairs, with a space between the racks of each pair, hereinafter called the "supply-chamber," and a space upon each side of the pair of racks, hereinafter called the "exhaust-chamber." For heating the grain (either for the purpose of drying it or for the purpose of heating it without drying it) heated air is introduced into the supply-chamber, whence it passes in opposite directions through the racks and through the grain contained in them, escaping into the exhaust-chambers. The heated air is introduced into the supply-chamber at the end thereof, and in practice it was found that its distribution was not uniform throughout the entire length of the racks, the tendency being for a greater volume of the air to pass through the racks at one end of the chamber than at the other end. One object of the invention is to correct this and to insure a practical uniformity with respect to the volume of air passing through the racks from end to end, and this object I accomplish by arranging in the supply-chamber a series of baffles against which the air impinges and by which it is deflected outward toward the racks, said baffles being preferably of successively-increasing areas from end to end of the supply-chamber.

It was also found that where each of the heating-racks was provided with only a single valve and this valve was located at the bottom of the rack, or, in other words, where the rack was in a single horizontal section, there was a lack of uniformity in the drying, due to the fact that some of the grain, especially that in direct contact with the slats of the racks, was more or less sheltered and protected from the current of heated air passing through the rack; and another object of the invention is to obviate this and insure greater uniformity. This object I accomplish by providing the apparatus with means whereby a given body of grain may be subjected to the action of the heated air until the heating is partially completed and then thoroughly mixed and again subjected to heated air until the heating is either partially or wholly completed, it being within the scope of the invention to provide the apparatus with means for thus mixing the grain either one or more times during the heating process. To this end I provide the heating-rack with one or more horizontal valves located above the bottom thereof, (in addition to the valve located at the bottom,) which divide the rack into a plurality of horizontal sections, so that the uppermost section may be filled with grain and the grain partially heated and the valve at the bottom of said section thereupon opened, allowing the grain to drop into the next lower section, in which the heating process is continued, the dropping of the grain into the lower section allowing a fresh charge of grain to drop into and fill the upper section. This process of partially heating the grain in the several horizontal sections of the heating-rack is repeated until the grain finally drops into the cooling-rack, which latter also is divided into a plurality of horizontal sections by a horizontal valve or valves. When the entire rack, including both the heating and cooling sections, is filled from top to bottom and the grain is held up by the valve at the bottom of the cooling-rack, it will no longer be necessary to manipulate the valves of the heating-rack in order to accomplish the object under consideration. This may be done by manipulating the valves of the cooling-rack, as it is manifest that if the valve at the bottom of the cooling-rack is opened while the valve next above it is closed only a part of the contents of the cooling-rack will be allowed to escape, and after it has escaped the closing of the valve at the bottom and the opening of the valve next above it (assuming that all valves above the latter valve are open) will allow a quantity of grain equal to the quantity discharged from the bottom of the cooling-rack to pass from the heating-rack into the cooling-rack and a similar quantity to pass from the garner into the heating-rack. In order to still further facilitate the successive treatment of the grain in the several sections of the heating-rack, I prefer to divide the supply-chamber of the heating-rack into horizontal sections corresponding with the horizontal sections of the rack itself and to provide means for separately supplying each of these sections of the supply-chamber with heated air.

It is sometimes desired to heat grain or other substances without drying it—as, for example, where wheat is to be softened for the purpose of rolling it into flakes. Another of the objects of the present invention is to provide means whereby this may be done. In order to accomplish this object, I provide means for preventing the air from escaping into the atmosphere upon leaving the exhaust-chambers of the heating-rack and for compelling it to return to the fan-chamber. This object I preferably accomplish by placing a valve or damper in the outlet-opening of the chamber into which the air escapes upon leaving the exhaust-chambers and establishing communication between said chamber and the fan or other blast apparatus, so that upon leaving the exhaust-chambers the air will be drawn into the eye of the fan and again returned to the supply-chamber, passing in transit through the heating apparatus.

When the apparatus is used for treating decorticated grain or other substances that are to be used in the production of sanitary food, it is desirable to maintain the apparatus in a clean condition; and another object of the invention is to provide means whereby easy access may be had to all parts of the grain-racks for the purpose of cleaning them. This object I accomplish by attaching the slats on one side of each rack to the supporting-uprights by means which will enable them to be readily removed, thus giving free access to the inner faces of the other slats and to the uprights.

In apparatuses of large capacity it is desirable to use a plurality of fans and a plurality of drums in which the air is heated in transit from the fans to the heating-racks, and in this case in order to insure uniformity in the heating of the grain in all of the racks it is necessary that the drums be maintained at the same temperature; and another object of the invention is to provide means whereby this may be accomplished. For this purpose I prefer to use in each of the drums a radiator, consisting of a coil or series of pipes adapted to be heated by steam, and to connect similar coils of both radiators with a common "header," into which the steam is introduced and from which it passes equally in opposite directions to the coils of the two radiators. A minor object of this part of the invention is to compel the steam to enter the coils of the radiators before it can reach the waste-outlet of the header, and to this end I divide the header horizontally by a diaphragm which extends nearly though not quite from end to end.

Another object of the invention is to provide an improved valve device for grain-racks constructed of uprights and staggered slats arranged in two vertical rows and sloping downward and toward each other. This object I accomplish by constructing the valve device as hereinafter described.

Another object of the invention is to provide means for checking the velocity of the heated air as it enters the supply-chambers of the heating-racks and diffusing it, so that it will enter the chambers with practical uniformity from top to bottom thereof, and this object I accomplish by disposing a reticulated wall or diaphragm in the inlet-opening of the chamber.

Other minor objects of the invention will appear hereinafter.

In order that the invention may be fully understood, I will describe it with reference to the accompanying drawings, which are made a part hereof, and in which—

Figure 2:
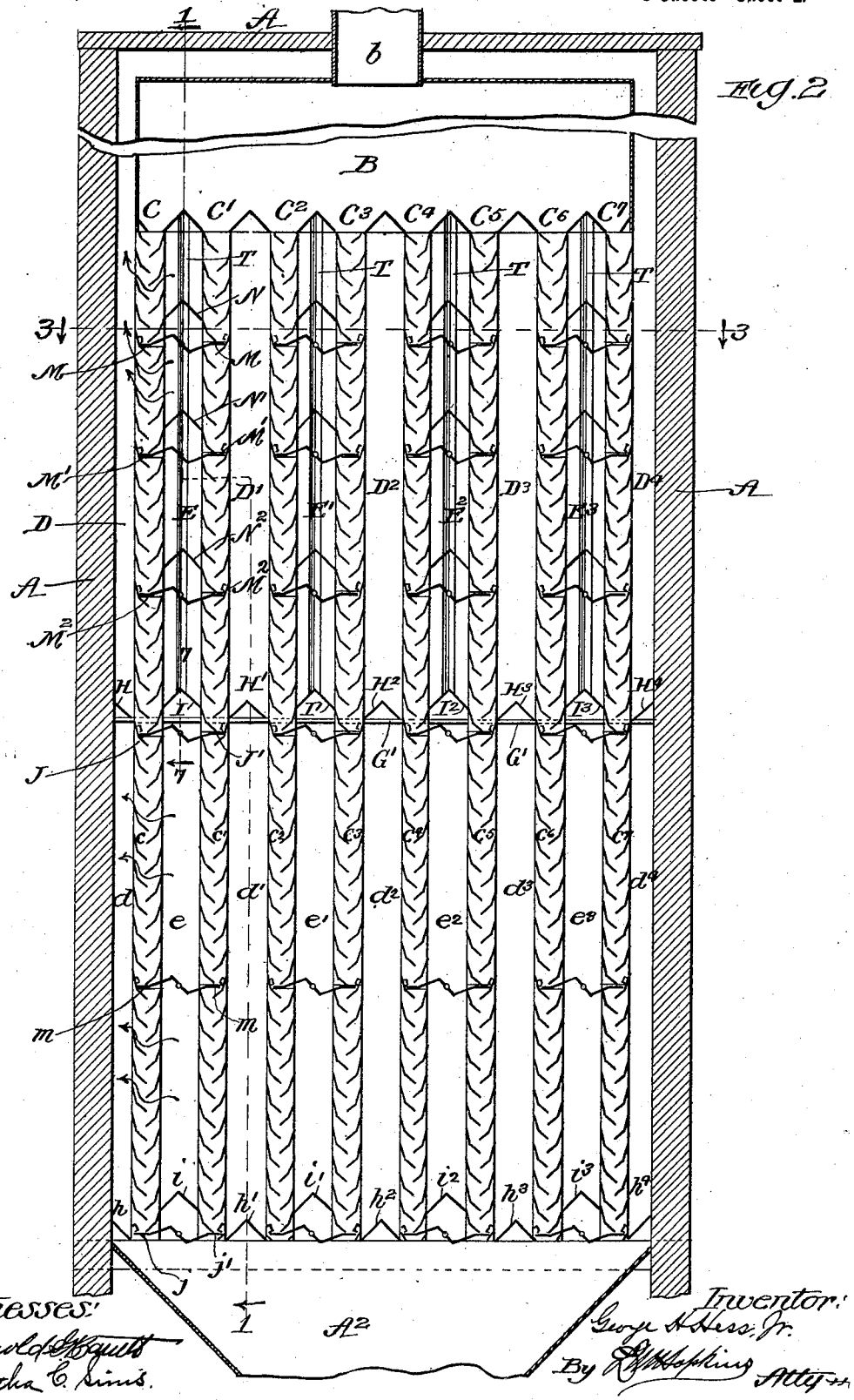

Figure 1 is a vertical section of an apparatus embodying the invention, the section being taken in the planes indicated by the offset line 1 1, Fig. 2, and by the two lines 1 1, Fig. 3, and the parts being viewed in the direction of the arrows. Fig. 2 is a vertical section thereof on the line 2 2, Figs. 1 and 3, the parts being viewed in the direction of the arrows. Fig. 3 is a horizontal section thereof on the line 3 3, Figs. 1 and 2, the parts being viewed from above. Fig. 4 is an enlarged vertical section of a portion thereof on the line 4 4, Figs. 1 and 3, the parts being viewed in the direction of the arrows. Fig. 5 is a sectional view, on a still larger scale, of the valve device on the line 5 5, Fig. 4, looking in the direction of the arrow. Fig. 6 is an enlarged vertical section of portions of the radiators and heating-drums, the section being taken through the center of one of the headers. Fig. 7 is a vertical section on the line 7 7, Fig. 4, looking in the direction of the arrow, the plane of the section being also indicated by the line 7 7, Fig. 2. Fig. 8 is an elevation of the parts shown in Fig. 4 looking in the direction of the arrow 8.

A represents the housing, through the roof or ceiling of which is a vent-opening A' under the control of a valve or damper $a$.

B is a garner into which the grain to be treated is introduced through a spout $b$, and C C', &c., are upright grain-racks, into which the grain from the garner falls by gravity. The outermost racks C and $C^7$ are located a sufficient distance from the walls of the housing to leave spaces D $D^4$, being two of the exhaust-chambers herein referred to, and the several racks are disposed at suitable distances apart to leave between them spaces D' $D^2$ $D^3$, being the remainder of the exhaust-chambers, and spaces E E' $E^2$ $E^3$, being the supply-chambers herein referred to, all of said exhaust and supply chambers being closed at top and bottom. At the ends of the racks are spaces F F', with which all of the exhaust-chambers communicate at both ends. The spaces F F' are divided horizontally by floor-sections G G', the exhaust-chambers are divided by floor-sections H H', &c., respectively, and the supply-chambers are divided by floor-sections I I', &c., respectively, the floor-sections in the exhaust and supply chambers being in the form of bulkheads, which are preferably of inverted-V shape in order to prevent grain from lodging upon them. The floor-sections or bulkheads H H', &c., and I I', &c., do not fall exactly in the same plane as the floor-sections G G', for the reason that the floor-sections H H', &c., and I I', &c., are supported by the slats of the racks in the manner shown in Fig. 4 and hereinafter described. These several floor-sections divide the interior of the housing into two compartments, the upper of which will hereinafter be called the "heating-compartment" and the lower the "cooling-compartment." At the level of the floor, or thereabout, valves J J' divide each of the racks into two sections, the upper of which will hereinafter be called the "heating rack or section" and the lower the "cooling rack or section." The racks are arranged in pairs, and the parts and accessories of each pair being similar to those of every other pair for the sake of brevity the following description will be confined to one pair, (the pair C C',) excepting when it becomes necessary to refer to others for the sake of clearness. Where similar parts exist both above and below the floor, capital letters will be used to designate those above and small letters to designate those below.

Some features of the invention are not limited to the construction of the rack further than that it shall be capable of sustaining the grain in a comparatively thin sheet or column occupying an upright position and of permitting air to pass through the column of grain from side to side. Preferably, however, each of the racks is constructed of a plurality of uprights K and a number of inclined slats. The number of uprights will depend upon the length of the rack, it being desirable to place them at rather close intervals in order to prevent the slats from sagging. The slats are arranged in two vertical rows upon opposite sides of a vertical plane cutting the uprights centrally, the slats of the two rows being staggered, so that the grain will slide from a slat of one row onto the next slat of the other row, and so on. The slats of one row L are bolted or otherwise permanently secured to flanges $k$ on the faces of the uprights, whereby the slats are not only supported, but the uprights secured and held in proper relation to each other, while the slats of the other row L' rest loosely upon flanges $k'$, which project from the faces of the uprights, the slats being supported and prevented from sliding off of the flanges by means of hooks $l'$ at their ends, which engage the flanges $k'$. Preferably the slats of the outer rows of each pair of racks, or, in other words, the slats of the rows adjacent to the exhaust-chambers, are thus supported by the hooks $l'$ or equivalent devices, so as to be removable in order to give access to the remaining slats and the inner faces of the uprights for cleaning them. This is preferred because the exhaust-chambers are unobstructed and are in practice of sufficient size to permit the attendant to enter them.

For a purpose already stated each heating-rack is divided into a plurality of horizontal sections by one or more valves. In the drawings I have shown three of such valves M, M' and $M^2$ so disposed that they divide the rack into four equal horizontal sections; but I desire to have it understood that in its broadest aspect the invention is not limited to the number of valves for this purpose. In like manner each cooling-rack is divided into a plurality of horizontal sections, and for this purpose I have shown in the drawings a single valve $m$, located about midway between the top and bottom of the rack, the bottom of the rack being closed by a valve $j$. All of the valves are similar in construction to the valves J J', enlarged views of which are shown in Figs. 4 and 5. Each consists of a plate or slide resting upon flanges $J^2$, that are bolted to the uprights K and are provided with perforations in order to permit the escape of any grain that may perchance pass between the ends of the valve and the uprights. There is, however, little chance for this, since the uprights are provided with flanges $k''$, which project over the ends of the valve and tend to prevent grain from passing it. The valve is mounted to slide close to the lower edge of one of the slats L and to abut against the opposite slat $L'$, a shield $L''$ being arranged in front of the slat $L'$ for the purpose of preventing the grain from passing between the edge of the slide and the slat $L'$. In order to increase the rigidity of the slide, it is provided on one of its margins with a downturned flange $J^3$, and to this flange two castings $J^4$ are bolted or otherwise secured, one near each of its ends. Each of these castings has a pair of ears $J^5$, perforated for the passage of a pin, which latter passes also through one end of a link $J^6$, the other end of which is jointed to the end of a lever $J^7$, carried by a rock-shaft $J^8$, journaled in supports $J^9$ and provided at its extremity, within the space F, with a handle $J^{10}$ for manipulating it. The valves $J J'$ are of similar construction and are similarly connected with the rock-shaft $J^8$, so that they are simultaneously operated.

The supply-chamber E is divided by one or more bulkheads into horizontal sections corresponding in number and location with the horizontal sections of the rack. In the drawings I have shown three such bulkheads at $N N' N^2$, each of which is preferably of inverted-V shape in order to prevent grain from lodging upon it. These bulkheads extend from end to end of the chamber and are supported by the slats of the racks on the sides thereof adjacent the supply-chamber in the same manner as are the bulkheads or floor-sections $I I'$, &c., one of which latter is shown on a larger scale in Fig. 4—that is to say, each of them rests near its outer edges upon the edges of the permanent slats L of the racks and has downturned portions $i''$, which lie against the inner faces of said slats, the downturned portions and the slats being secured together by bolts or other suitable devices. As before stated, these floor-sections $I I'$, &c., do not fall in precisely the same horizontal plane as the floor-sections $G G'$, the space at the ends of the floor-sections resulting from their inverted-V shape and from their being arranged above the floor-sections $G G'$ being closed by plates $i'''$ of appropriate shape. The supply-chamber is closed at one end and open at the other, a reticulated diaphragm O of wire-gauze or other suitable material being arranged over the open end for the purpose of breaking the velocity of the blast entering the chamber and diffusing the hot air over the chamber from top to bottom. Where the supply-chamber is divided, as above described, into a plurality of horizontal sections, each of said sections is supplied with air through a separate flue, four of which, $P P'$, &c., are shown in the drawings, and these flues are under the control of separate valves $p p'$, &c., so that the heated air may be turned into one or more of said sections, as may be necessary. The flues lead from a heating-drum Q, within which is arranged a radiator R of some suitable construction, the drum being supplied with air from a fan S or other blast apparatus, preferably located in the cooling-compartment of the housing. For the purpose of compelling practically equal volumes of air to pass through the racks from end to end thereof a number of baffles T are arranged in the supply-chamber. In the drawings I have shown four of them located opposite the uprights K, which divide the rack vertically into separate vertical sections, and I have shown them as of V shape in horizontal cross-section and as of successively increasing superficial area.

The floor-section $G'$ is provided with openings through which the heating and cooling chambers may be placed in communication, said openings being under the control of valves $g''$.

Where the apparatus is of large capacity, I prefer to use a plurality of fans and a plurality of heating-drums, two of such drums being shown in the drawings at Q and $Q'$. Each of these drums is heated by a radiator preferably made up of a number of radiating pipes or coils R in open communication with the interior of a header U. The header U is preferably made in three sections, the central section being provided with a steam-inlet $u$ and with an outlet $u'$. The radiating pipes or coils of the two radiators are in communication with the outer sections of the header, and the header is divided longitudinally into two passages by a horizontal diaphragm $u''$, which extends nearly, but not quite, from end to end of it, sufficient space being left between the ends of the diaphragm and the ends of the header to permit the water of condensation and waste steam to pass and reach the outlet $u'$. In order to facilitate the flow of water toward the ends of the diaphragm, it preferably slopes from the center in opposite directions. In the drawings I have shown the radiators as being made up of a plurality of headers, each having its radiating pipes or coils and each being separately supplied with steam through a valved branch pipe leading from a main steam-supply pipe V. The advantage resulting from the use of a single header common to the radiating pipes or coils of two or more heating-drums is that the said pipes or coils will be equally supplied with steam, and the drums therefore maintained at practically equal temperatures, and the advantage in constructing the radiators of a plurality of headers, each having its own radiating pipes or coils and each separately supplied with steam through a valved branch pipe, is that the radiators may be maintained at any desired temperature.

With an apparatus constructed as above described it is possible to uniformly heat the grain without drying it and either with or without cooling it or to uniformly heat and dry the grain either with or without cooling it. In order to heat the grain without drying it, the outlet-opening A' of the housing is closed by means of the damper $a$, the valves $g''$ $g''$ are opened, establishing communication between the heating-compartment of the housing and the compartment in which the fan is located, and the valve A'', which controls an opening through the wall of the housing and through which in another use of the apparatus atmospheric air is drawn into the cooling-compartment, is closed. The radiators being heated, a quantity of grain is allowed to fall into the upper horizontal section of the heating-rack, the valve M in said rack being closed in order to confine the grain therein and the valve $p$ in the hot-air flue P being opened. The fan when in operation will then force air into the drum, where it will be heated, after which it will pass through the flue P into the upper section of the supply-chamber, thence outward through the heating-racks C C' and into the exhaust-chambers D D', whence it will be drawn by the suction of the fan into the space F', and thence through the openings in the floor G' back to the eye of the fan, as indicated by the feathered arrows. Thus the same body of air is repeatedly passed through the heating-drum and through the grain successively. The grain having been partially heated in the upper sections of the racks, the valves M may be opened and the partially-heated grain allowed to drop into the next sections of the racks, a fresh charge of grain from the garner filling the upper sections of the racks. The valve $p'$ is then opened and the operation continued as before. These operations are repeated until all of the horizontal sections of the racks are filled with grain and the grain in the lowermost section has been heated to the desired extent. After this by manipulating the valves J at the bottom of the racks and the valves $M^2$ immediately above them one-quarter of the entire contents of the racks may be allowed to escape at the bottom and a corresponding quantity of grain admitted at the top of the racks at a time. In this use of the apparatus the grain is agitated and mixed three times during the heating process; but if it should be found unnecessary to agitate it so often one or more of the valves M M' $M^2$ may be thrown out of use—i. e., left open. For example, the valves M and $M^2$ may be thrown out of use, and in this event the grain will be agitated only once during its passage through the heating-rack and the quantity discharged and admitted at each operation will be equal to one-half the capacity of the said racks, the valves M' being located midway between the top and bottom of the racks. After heating the grain if it is not desired to cool it the valves $m$ and $j$ are left open and the grain allowed to fall into the hopper $A^2$, whence it is carried off by a suitable conveyer. Where it is desired to dry and cool the grain, the damper $a$ is opened, the valves $g''$ are closed, and the door or valve A'' is opened. The operations may then be carried on as before described; but in this use of the apparatus fresh air will be drawn into the cooling-chamber through the opening in the wall A and will pass from the space $f$ into the supply-chambers $e$ $e'$, &c., thence through the cooling-racks $c$ $c'$, &c., thence into the exhaust-chambers $d$ $d'$, &c., thence into the space $f'$, thence to the fan, thence to the heating-drum, thence into the supply-chambers E E', &c., thence through the heating-racks C C', &c., thence into the exhaust-chambers D D', &c., thence into the spaces F F', and thence to the atmosphere through the opening A', as indicated by the feathered arrows.

By the use of the valves $m$ in connection with the valves $j$ when the racks have once been filled from top to bottom all of the valves above the valves $m$ may be left open and the grain agitated in its passage through the heating-racks in the manner already described. For example, assuming the racks to be full and the grain in the lower half of the heating-racks to have been heated to the desired extent, the valves $j$ may be opened, whereupon the grain in the lower half of the cooling-racks will drop into the hopper $A^2$. The valves $j$ may then be closed and the valves $m$ opened, and as a result of this the entire body of grain above the valves $m$ will move downward in the manner already described and a fresh charge equal to that discharged from the cooling-racks will drop into the heating-racks.

Having thus described my invention, what I claim as new therein, and desire to secure by Letters Patent, is—

1. In an apparatus of the class described, the combination of a pair of upright grain-racks arranged side by side and having in their sides openings for the passage of air, a supply-chamber between said racks, said chamber being open at one end for the admission of air, means for causing a blast of air to enter said chamber horizontally, and a vertical baffle within the chamber for deflecting the air outward toward the racks, substantially as described.

2. In an apparatus of the class described, the combination of a pair of upright grain-racks arranged side by side and having in their sides openings for the passage of air, a supply-chamber between said racks, said chamber being open at its end for the admission of air, a fan for causing a blast of air to enter said chamber horizontally, and an upright baffle located within the chamber equidistant from the racks for deflecting the air outward toward the racks, substanially as described.

3. In an apparatus of the class described, the combination of a pair of upright grain-racks having in their sides openings for the passage of air and having uprights dividing them into separate vertical sections, a supply-chamber between said racks, said chamber being open for the admission of air, means for causing a blast of air to enter said chamber, and a series of baffles arranged in said chamber opposite the uprights for deflecting the air outward toward the racks, substantially as described.

4. In an apparatus of the class described, the combination of a pair of upright grain-racks having in their sides openings for the passage of air, a supply-chamber between said racks, said chamber being open for the admission of air, means for causing a blast of air to enter said chamber, and a reticulated diaphragm in the path of the entering air, substantially as described.

5. In an apparatus of the class described, the combination of an upright grain-rack having in its sides openings for the passage of air, a supply-chamber located at one side of said rack, a horizontal valve dividing the rack into a plurality of separate horizontal sections, a horizontal bulkhead dividing the supply-chamber into a plurality of horizontal sections corresponding with those of the rack, means common to all of said sections for heating air, means for causing a blast of the heated air to pass from said chamber into and through all of the several sections of the rack in the same direction, and separate means for controlling the passage of air into the separate sections of the chamber, substantially as described.

6. In an apparatus of the class described, the combination of an upright grain-rack having in its sides openings for the passage of air, a supply-chamber located at one side of the rack, a horizontal valve dividing the rack into a plurality of separate horizontal sections, a bulkhead dividing the supply-chamber into a plurality of horizontal sections corresponding with the sections of the rack, means common to all of said sections for heating air, separate flues leading therefrom and communicating with the separate sections of the supply-chamber, respectively, separate valves in said flues, and means for causing a blast of air to pass from the heater into the supply-chamber and thence into and through all of the several sections of the racks in the same direction, substantially as described.

7. In an apparatus of the class described, the combination of an upright grain-rack having in its sides openings for the passage of air, a horizontal valve dividing the rack into a heating-section and a cooling-section, a valve located at the bottom of the cooling-section, a valve located between the top and bottom of the cooling-section, and dividing it into a plurality of separate horizontal sections, a valve between the top and bottom of the heating-section and dividing it into a plurality of separate horizontal sections, means for causing a blast of cold air to pass through all parts of the cooling-section of the rack in the same direction, and means for causing a blast of heated air to pass through all parts of the heating-section of the rack in the same direction, substantially as described.

8. In an apparatus of the class described, the combination of a pair of upright grain-racks arranged side by side, having in their sides openings for the passage of air, a supply-chamber located between said racks, horizontal valves dividing the racks into a plurality of separate horizontal sections, means common to all of said sections for heating air and means for causing a blast of the heated air to pass through all of the several sections of each of the racks in the same direction, substantially as described.

9. In an apparatus of the class described, the combination of a pair of upright grain-racks arranged side by side having in their sides openings for the passage of air, horizontal valves dividing said racks into a plurality of separate horizontal sections, a supply-chamber located between the racks, a bulkhead located in the supply-chamber and dividing it into a plurality of horizontal sections corresponding with the sections of the racks, means common to all of said sections for heating air and means for separately supplying said sections of the supply-chamber with the heated air and causing it to pass through all of the several horizontal sections of each of the racks in the same direction, substantially as described.

10. In an apparatus of the class described, the combination of a pair of upright grain-racks arranged side by side having in their sides openings for the passage of air, horizontal valves dividing said racks into a plurality of separate horizontal sections, a supply-chamber located between the racks, a plurality of bulkheads dividing the supply-chamber into a plurality of separate horizontal sections corresponding with the sections of the racks, a separate air-flue communicating with each of said sections of the supply-chamber, means for separately controlling each of said flues, means common to all of said sections for heating air, and means for causing a blast of the heated air to pass through said flues and into the separate sections of the supply-chamber and thence through all of the several sections of each of the drying-racks in the same direction, substantially as described.

11. In an apparatus of the class described, the combination of a pair of upright grain-racks arranged side by side having in their sides openings for the passage of air, horizontal valves dividing the racks into heating-sections and cooling-sections, a housing inclosing the racks, means located at about the level of said valves and dividing the interior of the housing into compartments corresponding respectively with the heating-sections and the cooling-sections of the racks, horizontal valves dividing the heating-sections of the racks into a plurality of separate horizontal sections, horizontal valves dividing the cooling-sections of the racks into a plurality of separate horizontal sections, a supply-chamber located between the heating-sections of the racks, a supply-chamber located between the cooling-sections of the racks, exhaust-chambers located upon opposite sides of the heating-sections of the racks, exhaust-chambers located upon opposite sides of the cooling-sections of the racks, means for causing a blast of air to enter the supply-chamber of the cooling-sections and pass thence through all of said cooling-sections of each rack in the same direction and thence into the exhaust-chambers at the sides thereof, thence to the supply-chamber of the heating-sections of the racks, thence through all of said sections of each of the racks in the same direction and thence into the exhaust-chambers at the sides thereof, and means for heating the air in transit between the cooling and heating sections, substantially as described.

12. In an apparatus of the class described, a grain-rack comprising a plurality of uprights, each having two vertical rows of flanges, the flanges of the two rows being staggered, a plurality of slats permanently secured to the flanges of one row, and a plurality of slats resting upon the flanges of the other row and having hooks engaging said flanges, substantially as described.

13. In an apparatus of the class described, the combination of a pair of grain-racks, each having a plurality of slats, a chamber between said racks, and a horizontal bulkhead closing said chamber and supported by the slats of the rack, substantially as described.

14. In an apparatus of the class described, the combination of a pair of grain-racks, each having a plurality of slats, and a chamber between said racks, a horizontal bulkhead of inverted-V shape in cross-section closing said chamber and supported by the slats of the rack, substantially as described.

15. In an apparatus of the class described, the combination with a grain-rack having two vertical rows of staggered slats, of a valve mounted to move adjacent to the lower edge of a slat of one row and opposite an intermediate part of an adjacent slat of the other row, substantially as described.

16. In an apparatus of the class described, the combination with a grain-rack having two vertical rows of staggered slats, of a valve mounted to move adjacent to the lower edge of a slat of one row and opposite an intermediate part of an adjacent slat of the other row, and a shield located inside of the latter slat and terminating at its lower edge in close proximity to the valve, substantially as described.

17. In an apparatus of the class described, the combination with a grain-rack having a pair of uprights, of a valve mounted to slide between said uprights, flanges projecting from the uprights and extending over the ends of the valve, and flanges carried by the uprights and supporting the valve, substantially as described.

18. In an apparatus of the class described, the combination with a grain-rack having a pair of uprights, of a valve mounted to slide between said uprights, flanges projecting from the uprights and extending over the ends of the valve, and flanges carried by the uprights and supporting the valve, said flanges being provided with openings for the escape of grain, substantially as described.

19. In an apparatus of the class described, the combination with a plurality of grain-racks, of a plurality of heating-drums, a radiator in each of said heating-drums, and a header common to said radiators, substantially as described.

20. In an apparatus of the class described, the combination with a plurality of grain-racks, of a plurality of heating-drums, separate radiating-pipes in said drums, a header common to the radiating-pipes of said drums, and means for supplying said header with steam, substantially as described.

21. In an apparatus of the class described, the combination with a plurality of grain-racks, of a plurality of drums, a radiator in each of said drums, a header common to said radiators, a central inlet for steam, and a diaphragm dividing the header, substantially as described.

GEORGE H. HESS, Jr.

Witnesses:
L. M. HOPKINS,
B. C. SIMS.